(12) United States Patent
Chemin et al.

(10) Patent No.: US 7,629,776 B2
(45) Date of Patent: Dec. 8, 2009

(54) CONTROL AND POWER MODULE FOR A ROTATING ELECTRICAL MACHINE

(75) Inventors: Michael Chemin, Festigny (FR); Francois-Xavier Bernard, Creteil (FR); Frederic Leroux, Creteil (FR)

(73) Assignee: Valeo Equipments Electriques Moteur, Creteil (FR)

( * ) Notice: Subject to any disclaimer, the term of this patent is extended or adjusted under 35 U.S.C. 154(b) by 175 days.

(21) Appl. No.: 11/574,330

(22) PCT Filed: Aug. 31, 2005

(86) PCT No.: PCT/FR2005/002178

§ 371 (c)(1),
(2), (4) Date: Jun. 21, 2007

(87) PCT Pub. No.: WO2006/027481

PCT Pub. Date: Mar. 16, 2006

(65) Prior Publication Data

US 2007/0278966 A1 Dec. 6, 2007

(30) Foreign Application Priority Data

Aug. 31, 2004 (FR) .................................. 04 09212

(51) Int. Cl.
H02P 11/00 (2006.01)
H02H 7/06 (2006.01)
H02P 9/00 (2006.01)
H02P 7/32 (2006.01)
H02P 7/34 (2006.01)

(52) U.S. Cl. .............................. 322/24; 322/19; 322/28; 322/29; 322/44; 318/141; 318/145

(58) Field of Classification Search .................. 322/19, 322/24, 28, 29, 44; 318/141, 145
See application file for complete search history.

(56) References Cited

U.S. PATENT DOCUMENTS

| 4,574,225 | A | * | 3/1986 | Pershall et al. | 318/400.26 |
|---|---|---|---|---|---|
| 4,628,438 | A | * | 12/1986 | Montague | 363/134 |
| 4,713,590 | A | * | 12/1987 | Ohno | 318/400.23 |
| 4,815,052 | A | | 3/1989 | Walker | 363/87 |
| 5,629,606 | A | * | 5/1997 | Asada | 322/28 |
| 5,648,705 | A | | 7/1997 | Sitar et al. | 318/145 |
| 5,686,819 | A | * | 11/1997 | Iwatani et al. | 322/25 |

(Continued)

FOREIGN PATENT DOCUMENTS

EP 1443623 8/2004

(Continued)

*Primary Examiner*—Nicholas Ponomarenko
*Assistant Examiner*—Pedro J Cuevas
(74) *Attorney, Agent, or Firm*—Jacox, Meckstroth & Jenkins

(57) ABSTRACT

A control and power module for a rotating electrical machine comprising a power circuit containing a number of branches, and a control circuit designed for controlling the power circuit when the machine operates in a nominal mode. The inventive module is characterized in that the control circuit is also designed for monitoring an output voltage from the power circuit and blocking at least one branch of the power circuit in a conduction state when the output voltage reaches an at least first threshold value so that the machine functions in a degraded mode. The invention is for use in an alternator starter.

23 Claims, 4 Drawing Sheets

U.S. PATENT DOCUMENTS

| | | | | |
|---|---|---|---|---|
| 5,793,167 | A | 8/1998 | Liang et al. | 318/141 |
| 6,137,247 | A * | 10/2000 | Maehara et al. | 318/140 |
| 6,700,354 | B2 * | 3/2004 | Okuno et al. | 322/29 |
| 6,777,905 | B2 * | 8/2004 | Maehara | 318/650 |
| 6,803,748 | B2 | 10/2004 | Peter | 322/29 |
| 7,009,366 | B2 * | 3/2006 | Maehara | 322/28 |
| 7,075,272 | B2 * | 7/2006 | Sasaki et al. | 322/28 |
| 7,098,628 | B2 * | 8/2006 | Maehara et al. | 322/24 |
| 7,106,029 | B2 * | 9/2006 | Inokuchi et al. | 322/28 |
| 7,235,952 | B2 * | 6/2007 | Maehara | 322/24 |
| 7,365,520 | B2 * | 4/2008 | Tsuzuki | 322/28 |
| 7,405,541 | B2 * | 7/2008 | Inokuchi et al. | 322/8 |
| 7,423,351 | B2 * | 9/2008 | Maehara | 290/40 C |
| 7,466,169 | B2 * | 12/2008 | Asada et al. | 327/110 |
| 2002/0171401 | A1 | 11/2002 | Naidu et al. | 322/28 |
| 2004/0150376 | A1 | 8/2004 | Peter | 322/29 |
| 2005/0017694 | A1 | 1/2005 | Masson et al. | 322/19 |
| 2005/0046397 | A1 | 3/2005 | Peter | 322/44 |
| 2005/0135133 | A1 * | 6/2005 | Maehara | 363/144 |
| 2006/0186863 | A1 | 8/2006 | Yamamoto et al. | 322/28 |
| 2006/0197346 | A1 * | 9/2006 | Maehara | 290/40 B |
| 2006/0238172 | A1 * | 10/2006 | Maehara et al. | 322/33 |
| 2007/0278966 | A1 * | 12/2007 | Chemin et al. | 315/209 R |
| 2008/0100978 | A1 * | 5/2008 | Maebara et al. | 361/93.8 |

FOREIGN PATENT DOCUMENTS

| | | |
|---|---|---|
| WO | WO 03032465 | 4/2003 |

* cited by examiner

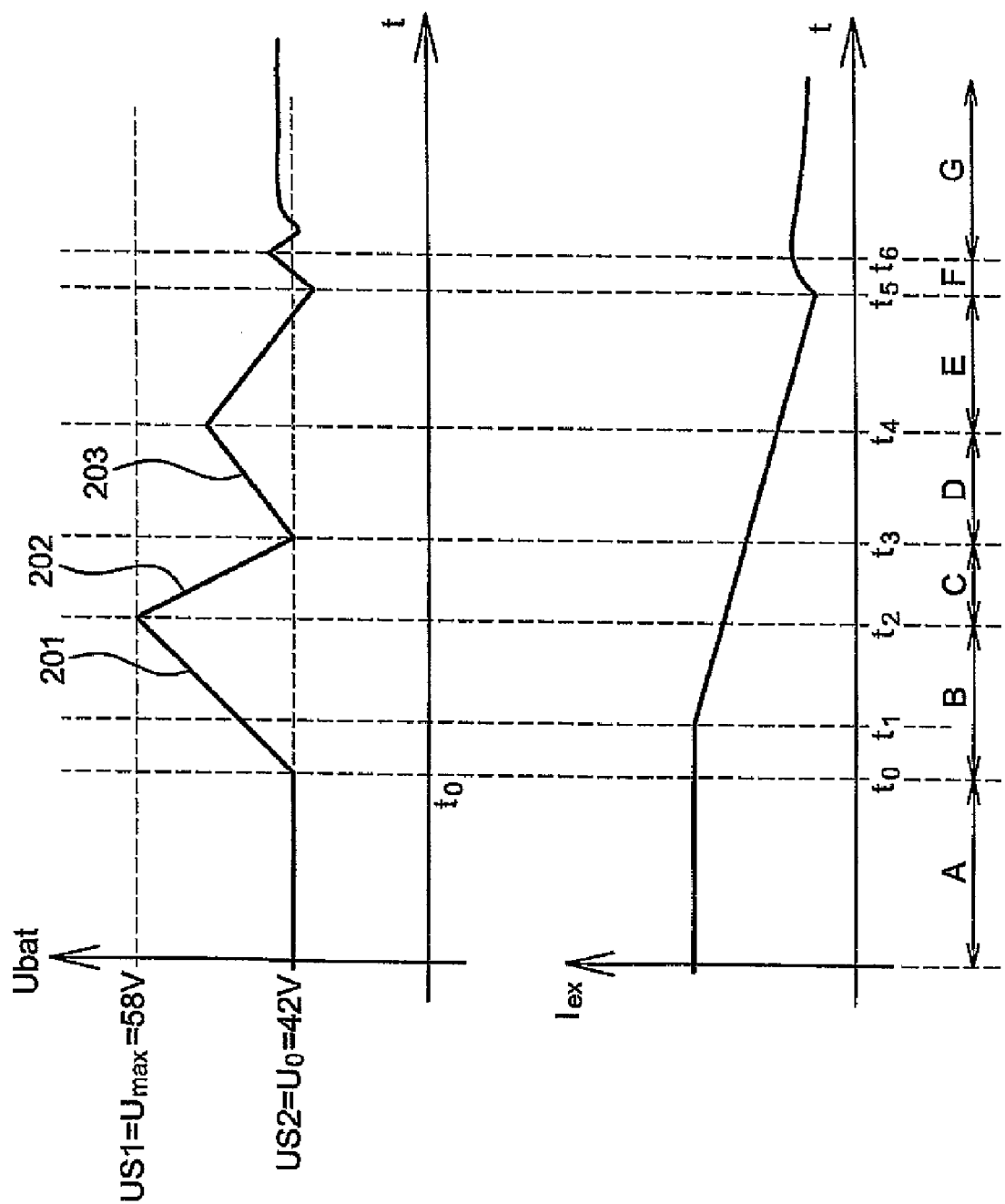

CONTROL AND POWER MODULE FOR A ROTATING ELECTRICAL MACHINE

BACKGROUND OF THE INVENTION

1. Field of the Invention

The present invention concerns in general terms the protection of electrical systems against load dump. It applies in particular in the automobile field.

2. Description of the Related Art

In a motor vehicle, an electrical system, referred to as an "on-board system", serves to supply the electrical equipment with which the vehicle is equipped. Such an on-board system can be assimilated to a DC supply bus. The supply is provided by at least one battery. The latter is recharged by virtue of a rotary electrical machine, from the energy supplied by the rotation of the thermal engine of the vehicle. The rotary electrical machine means more generally any single- or polyphase rotary electrical machine for producing output DC current supplying the on-board system. It may in particular be an alternator or an alternator/starter.

In the event of abrupt disconnection of an electrical load in the on-board system, or of a battery, or both, a phenomenon of load dump ("load-dump" in English) is created, which causes an overvoltage on the on-board system. This is because, since a regulation of an inducing current in the machine cannot act sufficiently quickly following the load dump, the machine continues to deliver the same output current whereas the current consumption on the on-board system side has dropped.

Conventionally, the vehicle battery is a 14 volt battery. In principle, by virtue of its low internal resistance, it limits to approximately 17 volts the voltage peaks that occur on the on-board system of the vehicle in the event of load dump. The battery thus absorbs the small overvoltages. Nevertheless, in the event of disconnection of the battery (due to the breakage of a supply cable, for example), a very high overvoltage may occur on the on-board system. This is because the current delivered by the machine charges the capacitances (including the stray capacitances) connected to the on-board system, and consequently causes the DC voltage of the on-board system to increase significantly.

This overvoltage risks damaging the electrical equipment supplied by the on-board system. This is why all the electrical equipment on the vehicle is sized to withstand a maximum voltage of approximately 32 volts, which corresponds to an overvoltage of approximately 20 volts.

Various solutions are known for limiting the voltage on the on-board system to a maximum acceptable voltage, that is to say the highest voltage that the electrical equipment on the vehicle can withstand without risk of damage.

For example, the document WO 03/032465 proposes a first embodiment using, for switches in a power circuit, power MOSFET transistors that are calibrated for voltage in order to work by avalanche effect for a given voltage, lower than the maximum acceptable voltage. Thus, in the event of load dump, the limitation of the voltage of the on-board system is guaranteed by the power transistors constituting the switches of the bridge rectifier going into avalanche.

The same document WO 03/032465 also mentions a conventional solution consisting of adding Zener diodes to the on-board system in order to limit the voltage of the on-board system.

Other solutions consist of adding an additional load in the on-board system in order to absorb the surplus energy in the event of load dump.

These known solutions have certain advantages but are imperfect in the context of the future use of batteries of larger capacity, for example 42 volts, in vehicles, made necessary by the tendency towards the increase in electrical equipment with high energy consumption. This is because, according to the specifications of a future European Standard (still in the course of drafting), the electrical equipment of the on-board system of the vehicle will probably have to be sized to function up to a voltage of 48 volts and to withstand a maximum voltage of 58 volts, which corresponds to an overvoltage of only 10 volts.

However, the limitation voltage or clipping voltage of MOSFET transistors is too high (above 58V) and is not sufficiently controlled to enable them to be used in this context. This is because the clipping value of MOSFETs depends in particular on a parameter such as temperature.

In addition, in the case of the use of Zener diodes with MOS transistors, they must be able to absorb currents of several hundreds of amperes, giving rise to significant bulk and additional cost since it is necessary to add several of them. The same applies for the additional loads.

What is needed, therefore, is an improved system and method for protecting an electrical system that also overcomes one or more of the problems in the prior art.

SUMMARY OF THE INVENTION

One embodiment of the invention therefore aims to propose a control and power module for a rotary electrical machine comprising a plurality of phase windings, the module comprising:
  a power circuit comprising a plurality of branches intended to be associated with the plurality of phase windings, and
  a control circuit constructed to control the power circuit when the machine is functioning in nominal mode, which is an alternative to the known solutions, in order to obtain a limitation of the voltage on the on-board system of a motor vehicle.

The invention also aims to propose a method of controlling a rotary electrical machine implemented in the control and power module.

To this end, according to a first aspect of the invention, the control circuit is constructed so as also:
  to monitor an output voltage of the power circuit;
  to lock at least one branch of the power circuit in a conduction state when the output voltage reaches at least one first threshold value so that the machine functions in degraded mode.

Thus the locking of at least one branch of the power circuit has the effect of reducing the current generated by the alternator. This makes it possible to make the voltage on the on-board system drop because of the consumption of current by the electrical equipment that remained connected to it, whilst waiting for the regulation to adapt the excitation current injected into the field winding of the machine.

In a non-limiting embodiment, the control circuit is constructed so as in addition to re-establish the functioning of the machine in nominal mode when the output voltage reaches a second threshold value. Thus this makes it possible to return to a normal operating mode when an overvoltage no longer exists.

In a non-limiting embodiment, the control circuit is constructed so as to lock all the branches of the power circuit when the output voltage reaches a first threshold value. Thus the machine is short-circuited. It no longer outputs any current. Because of this the voltage delivered to the on-board system drops rapidly and an overvoltage is thus limited.

In a non-limiting embodiment, the power circuit also comprises energy accumulation means. These means are a capacitor. Thus, the capacitor fulfills the role of a mini battery. This is because it supplies current to the on-board system when the machine is no longer generating any current, or not sufficiently so. Thus, all the branches of the power circuit can be locked. The current delivered by the machine is then zero, but the supply to the electrical equipment connected to the on-board system is provided by this capacitor.

In a non-limiting embodiment, the at least first threshold value is higher than the second threshold value. Thus, the degraded mode is triggered when the output voltage of the power circuit exceeds a value that is greater than the operating value in nominal mode of the machine.

In a non-limiting embodiment, the second threshold value is approximately equal to a nominal value of a voltage that is delivered by the power circuit in nominal mode. Thus degraded mode is left only when the value of the voltage on the on-board system has regained its nominal value.

In a non-limiting embodiment, the at least first threshold value is lower than a voltage destroying electrical equipment intended to be supplied by the output voltage of the power circuit. Thus, this electrical equipment is protected against destruction by overvoltage.

In a non-limiting embodiment, the control circuit is adapted so as, when a branch is locked, to maintain the branch in a first conduction state for part of the locking time and to maintain the branch in a second conduction state during the rest of the locking time. This embodiment makes it possible to distribute the thermal dissipation between the components of one branch, and this in alternation. This thus limits heating thereof.

In a non-limiting embodiment, the saidat least one branch comprises two switches, and in a given state of conduction of the saidbranch one of the switches is conducting and the other switch is off.

In a non-limiting embodiment, the control circuit is adapted to maintain all the branches of the power circuit that are locked in the same conduction state. This makes it possible to short-circuit one or more phase windings and therefore to reduce the current generated by the machine.

In a non-limiting embodiment, a switch comprises at least one power transistor.

In a non-limiting embodiment, the locking of said at least one branch takes place at a locking frequency lower than an operating frequency of the power circuit in nominal mode. Thus the machine generates a lower current or no more current during the time necessary for the voltage on the on-board system to decrease sufficiently to limit an overvoltage.

Advantageously, the present invention does not add any electronic components. In addition it makes it possible to maintain the power supply to the electrical components of the on-board system in the event of load dump.

A second aspect of the invention relates to a polyphase reversible rotary electrical machine comprising a control and power module according to the first aspect above.

Finally, a third aspect of the invention concerns a method of controlling a rotary electrical machine adapted to function in a nominal mode, the machine comprising a plurality of phase windings and a power circuit comprising a plurality of branches intended to be associated with the plurality of phase windings. The method comprises the steps of:

monitoring an output voltage of the power circuit;
locking at least one branch of the power circuit in a conduction state when the output voltage reaches an at least first threshold value so that the machine is functioning in a degraded mode.

In a non-limiting embodiment, the method comprises a supplementary step of re-establishing the functioning of the machine in nominal mode, when the output voltage reaches a second threshold value.

In a non-limiting embodiment, in the locking step, all the branches of the power circuit are locked when the output voltage reaches a first threshold value.

In a non-limiting embodiment, during the step of locking a branch, the branch is maintained in a first conduction state during part of the locking time and is maintained in a second conduction state during the rest of the locking time.

In a non-limiting embodiment, the locked branches of the power circuit are all maintained in the same conduction state.

In a non-limiting embodiment, the step of locking the at least one branch takes place at a locking frequency lower than an operating frequency of the power circuit in nominal mode.

These and other objects and advantages of the invention will be apparent from the following description, the accompanying drawings and the appended claims.

BRIEF DESCRIPTION OF THE FIGURES

Other characteristics and advantages of the invention will also emerge from a reading of the following description. The latter is purely illustrative and must be read with regard to the accompanying drawings, in which:

FIG. 3 shows a graph of the voltage on an on-board system of a vehicle and a graph of the excitation current of the electrical machine of the vehicle, in the case of load dump, when the present invention is implemented;

DETAILED DESCRIPTION OF PREFERENTIAL EMBODIMENTS OF THE INVENTION

The present invention will now be described in the context of its application to the control of a polyphase rotary electrical machine such as one of those mentioned in the introduction. Here the concern is only with the mode of functioning as an alternator of these machines. This mode is the only operating mode for an alternator. It is one of the possible operating modes for machines of other types. For the remainder of the description, the non-limiting example of an alternator/starter 30, a reversible machine, will be taken.

Moreover, for the remainder of the description, electrical equipment may be termed indifferently consumers or loads.

An alternator/starter 30 comprises three operating modes. An idle mode, an alternator mode, also referred to as generator mode, and a motor mode comprising a starting mode, known to persons skilled in the art.

Figure 1:
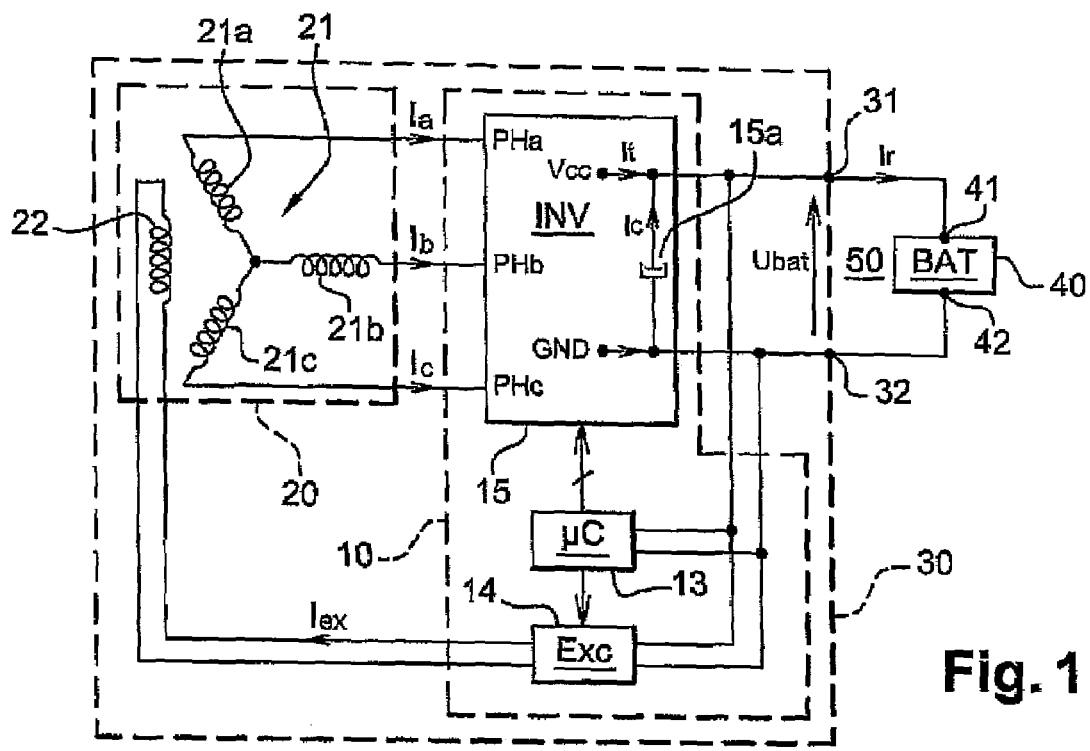
FIG. 1 is a diagram illustrating an embodiment of the control and power module according to the first aspect of the present invention and of the electrical machine according to a second aspect of the present invention.

FIG. 1 shows schematically an alternator/starter 30 according to the invention. The alternator/starter 30 is installed in a vehicle (not shown) comprising an electrical system 50, also referred to as the on-board system.

The alternator/starter 30 comprises:
an electromechanical part 20,
an electronic part forming a control and power module 10,
a high supply terminal 31, and
a low supply terminal 32.

The two terminals 31 and 32 are respectively connected to a positive terminal 41 and to a negative terminal 42 of a battery 40, through the electrical system 50. In a non-limiting example, the battery 40 is a 42 volt battery. The electrical potentials at the terminals 41 and 42 are denoted B+ and B− respectively. Conventionally the terminal 42 is connected to the chassis of the vehicle so that the potential B− is merged with the earth potential. The battery voltage is denoted Ubat, that is to say the difference in electrical potential between the terminals 41 and 42 of the battery 40. This voltage is the voltage available on the on-board system 50, and between the terminals 31 and 32 of the alternator/starter, except obviously in the event of disconnection of the battery. Nevertheless, loosely speaking, the voltage on the on-board system 50 and between the terminals 31 and 32 of the alternator/starter will always be designated Ubat, even in the case of disconnection of the battery. In the example taken, the battery 40 is a 42V battery that makes it possible to supply large consumers, such as for example electronic components of electric heating or air conditioning, or a DC-to-DC converter. It should be noted that not all the electrical consumers are necessarily sized at 42V but some may remain sized for 12V, such as for example a car radio, windscreen wipers or vehicle controllers. In this case, there exists a second 12V battery (not shown) and a DC-to-DC converter between the first 42V battery and the second 12V, the converter converting the power delivered by the alternator/starter 30 into 12V.

The electromechanical part 20 of the alternator/starter comprises:
an induced element 21, and
an inducing element 22.

In one example, the induced element 21 is the stator, and the inductor 20 is the rotor. The stator 21 comprises a number N of phase windings. In the example considered here, N is equal to 3. In other words, the alternator/starter 30 according to the present example embodiment is a machine with a rotor-type field winding and a three-phase stator-type armature. In the example illustrated in FIG. 1, the phase windings 21a, 21b and 21c of the induced element 21 are disposed in a star configuration, the voltage at the common end of the three phase windings here being floating. Nevertheless, this is not limiting, a configuration in a ring, for example in a delta, also being able to be envisaged.

The control and power module 10 comprises:
a control circuit 13,
an excitation circuit 14 generating an excitation current Iex that is injected into the inducing element 22, and
an electronic power circuit 15.

In a non-limiting embodiment, the control circuit 13 comprises a microcontroller. This microcontroller receives the voltage available between the supply terminals 31, 32 of the alternator/starter, that is to say the voltage Ubat on the on-board system 50, for example on an analogue input coupled to an internal analogue to digital converter. The voltage Ubat is thus monitored by the control circuit 13. There is thus easy access to the voltage Ubat.

The excitation circuit 14 can comprise an assembly of electronic components. Its design is known per se and does not need to be described in any further detail here.

The power circuit 15 comprises:
a high supply input/output, denoted VCC,
a low supply input/output, denoted GND,
three phase inputs/outputs, PHa, PHb and PHc, and
a switch bridge and its control electronics, also referred to as a bridge rectifier when the machine is functioning in alternator mode and inverter when the machine in functioning in motor mode.

The first supply input/output VCC is coupled to the high supply terminal 31 of the alternator/starter in order to receive the potential B+. The second supply input/output GND is coupled to the low supply terminal 32 of the alternator/starter in order to receive the potential B−. Thus the voltage Ubat is available between the inputs/outputs VCC and GND of the power circuit 15.

In operation, the three phase inputs/outputs PHa, PHb and PHc are coupled to the free end of one of the phase windings respectively 21a, 21b and 21c, in the star configuration of the stator that is envisaged here. In the case of a ring configuration of the stator, the inputs/outputs PHa, PHb and PHc are each coupled to one of the nodes common to two phase windings. In all cases the inputs/outputs PHa, PHb and PHc receive the currents induced in the phase windings 21a, 21b and 21c by the rotation of the field winding 22 or deliver in these windings currents drawn from the battery 40. Subsequently and in the figures, these currents will be denoted Ia, Ib and Ic.

Figure 2:
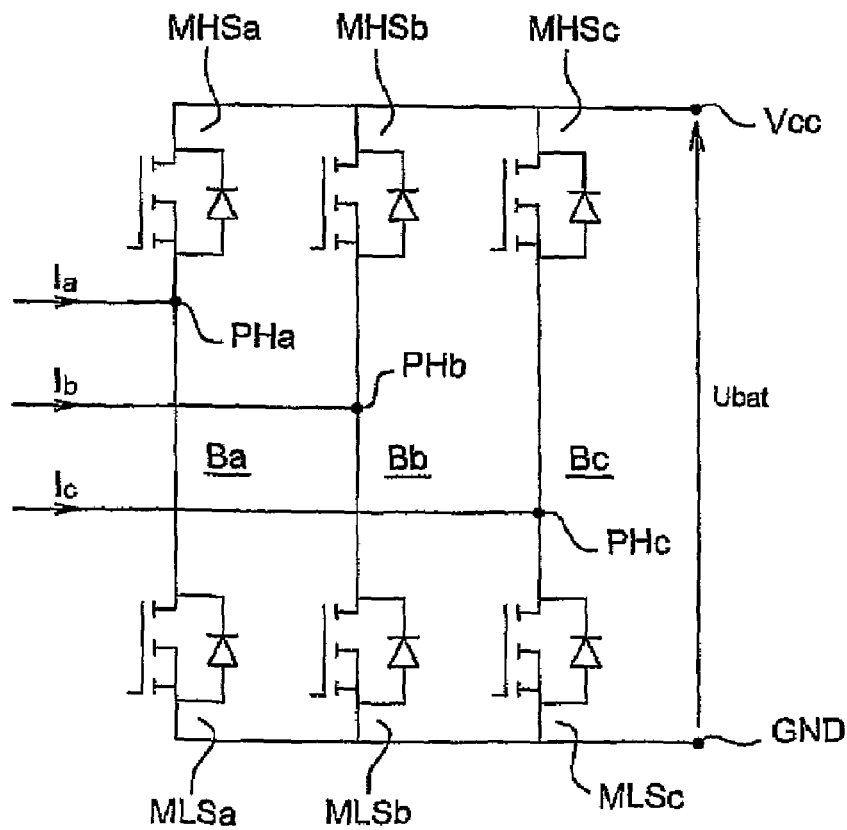
FIG. 2 is a diagram of a power transistor bridge included in an example embodiment of a power circuit belonging to the control and power module of FIG. 1.

In a non-limiting embodiment, the switch bridge is illustrated by the diagram in FIG. 2. The control electronics (not shown) comprise in particular driver circuits ("driver" in English). They are known per se, so that they do not need to be described in further detail here.

The switch bridge comprises three branches Ba, Bb and Bc, respectively associated with the three phase windings 21a, 21b and 21c of the armature 21.

In a non-limiting preferential embodiment, each branch comprises two switches. A switch comprises at least one power transistor. Preferentially, a switch comprises a plurality of transistors disposed in parallel. This makes it possible to have less loss by Joule effect. The power transistors are for example MOSFET transistors. In a variant they may be IGBT transistors (from the English "Insulated Gate Bipolar Transistor") or bipolar power transistors.

Thus, in a non-limiting embodiment, the branch Ba of the switch bridge comprises a high transistor MHSa (or "High Side" transistor) in series with a low transistor MLSa (or "Low Side" transistor) between the inputs/outputs VCC and GND. These are for example NMOS transistors.

The drain and source of the transistor MHSa are respectively connected to the input/output VCC and the input/output PHa of the power circuit 15. Likewise, the drain and source of the transistor MLSa are respectively connected to the input/output PHa and to the input/output GND of the power circuit 15. In other words, the drain of the transistor MLSa and the source of the transistor MHSa, which are connected together, form the output node of the branch Ba that is connected to the input/output PHa of the power circuit 15.

Likewise, the branch Bb of the transistor bridge comprises a high side transistor MHSb in series with a low side transistor MLSb between the inputs/outputs VCC and GND. These are also NMOS transistors. The drain and source of the transistor MHSb are respectively connected to the input/output VCC and to the input/output PHb of the power circuit 15. Likewise, the drain and source of the transistor MLSb are respectively connected to the input/output PHb and to the input/output GND of the power circuit 15. In other words, the drain of the transistor MLSb and the source of the transistor MHSb, which are connected together, form the output node of the branch Bb that is connected to the input/output PHb of the power circuit 15.

Finally, the branch Bc of the transistor bridge comprises a high side transistor MHSc in series with a low side transistor MLSb between the inputs/outputs VCC and GND. These are also NMOS transistors. The drain and source of the MHSc transistor are respectively connected to the input/output VCC and to the input/output PHc of the power circuit 15. Likewise, the drain and source of the transistor MLSc are respectively connected to the input/output PHc and to the input/output GND of the power circuit 15. In other words, the drain of the transistor MLSc and the source of the transistor MHSc, which are connected together, form the output node of the branch Bc that is connected to the input/output PHc of the power circuit 15.

It should be noted that, for the high side transistors or the low side transistors, it may be a case of a set of transistors disposed in parallel as described above.

Each branch Ba, Bb and Bc comprises two possible conduction states. These two states each correspond to a direction of flow of the current respectively Ia, Ib and Ic at the input/output respectively PHa, PHb and PHc of the power circuit 15, to which it is coupled. The first state, called the "high" conduction state, corresponds to the conducting state of the high side power transistor and to the off state of the low side power transistor of the branch. Thus, for the first branch Ba for example, the associated current Ia flows from the phase winding 21a to the high supply input/output VCC. Conversely, the second state, referred to as the "low" conduction state, corresponds to the conductive state of the low side power transistor and to the off state of the high side power transistor of the branch. Thus the associated current Ia flows from the low input/output GND to the phase winding 21a. It will be recalled that the induced currents Ia, Ib and Ic are alternating currents.

The functioning of the alternator/starter 30 will now be described.

In alternator operating mode, when the alternator/starter is functioning under normal conditions, ie in nominal mode, a current It is generated (depicted in FIG. 1) by the rotation of the alternator/starter when it is driven by the thermal engine. The alternator/starter 30 is then controlled so as to rectify the induced currents Ia, Ib and Ic and to regulate the inducing current Iex and subsequently the generated current It. It should be stated that the amplitude of the induced currents Ia, Ib and Ic is a function of the inducing current Iex and the current generated It is a function of the three rectified induced currents.

In order to carry out the regulation (depicted in FIG. 1) by the machine, a chopping or cutting of the inducing current Iex is carried out by the excitation circuit 14 at a frequency of approximately 100 Hz. The torque taken off by the machine on the thermal engine and therefore the power generated by the machine is thus regulated.

Moreover, in order to carry out the rectification, the switch bridge of the power circuit 15 is used. It makes it possible to effect a rectification of the induced currents Ia, Ib and Ic. For this purpose, either the control circuit 13 controls a switching of the switches of the bridge at an electrical frequency of the machine of around 1 kHz (synchronous rectification), or the switches function as a conventional diode bridge, the switches being at this time all in the off position. The synchronous rectification and functioning as a diode bridge being known to persons skilled in the art, they will not be described in detail.

It should also be stated that the electrical frequency of the machine is a function of the frequency of the speed of the thermal engine, the number of pairs of poles of the rotor and the belt ratio, the belt being disposed on a shaft of the rotor and, in a known manner, allowing cooperation between the machine and the thermal engine.

Thus, the electrical frequency of the machine, which therefore corresponds to the operating frequency of the power circuit, is adapted for effective functioning in alternator mode, that is to say to optimize the generation of the current It.

It should be noted that, in idle mode, that is to say when the vehicle is at rest, all the switches in the branches are open.

Moreover, it should be noted that, in motor mode, there exists a chopping of the battery voltage Ubat, and this generally at 20 kHz. This makes it possible to regulate the induced currents Ia, Ib, Ic of the machine and the inducing current Iex and consequently the torque supplied by the machine, the machine taking off current from the battery. Such a chopping may interfere with the whole of the on-board system and the battery. Thus, in order to stabilize the battery voltage Ubat, the power circuit 15 has a filtering capacitance with a generally high value disposed between the supply inputs/outputs VCC and GND. It is for example a capacitance of 50 mF. This value being relatively high, provision is made for the capacitance to comprise at least one discrete capacitor 15a for this function, for example a chemical capacitor.

In addition to nominal mode, the invention proposes a degraded mode, in which the machine is made to function in response to a load dump.

Returning to alternator mode, when the machine generates a code It to supply a given number of items of electrical equipment in the vehicle, and one of the items of equipment has just been cut off, there exists a reaction time Tt of the machine for regulating the generated current It. Thus, in the case of cutting off of a small item of electrical equipment, ie one consuming little current, for example windscreen wipers, a small overvoltage appears transiently on the on-board system, which is easily absorbed by the battery 40, which then serves as a buffer during the reaction time Tt of the machine for regulation.

Nevertheless, in the case of the cutting off of a large item of electrical equipment, ie one consuming a great deal of current, for example a heated windscreen, and/or in the case of disconnection of the battery 40 when it is discharged (connection of the terminal 31 cut off), there occurs what is termed a load dump ("load dump" in English) transiently causing an overvoltage that may reach a high value (this overvoltage is sometimes referred to "overshoot" in the jargon of persons skilled in the art) and which may thus blow all the electrical equipment connected to the on-board system.

It should be noted that the expression "transiently" above refers to the fact that the overvoltage takes place only during the time necessary for the excitation current Iex injected into the field winding 22 to be reduced, ie during the reaction time Tt of the machine described above. This reduction stems from the regulation by the excitation circuit 14 aimed at ensuring that the output current It of the alternator/starter corresponds to the current that remains consumed Ir (shown in FIG. 1) in the part of the on-board system 50 to which the alternator/starter 30 remains connected.

It should be noted that the consumed current Ir represents all the consumed currents in the electrical equipment plus the one consumed in the battery.

In addition, it should be noted that the battery 40 can be assimilated to a large consumer in the case where it is discharged since at this time it consumes a great deal of current in order to recharge, and can be assimilated to a small consumer in the case where it is completely charged.

A load dump and the regulation of excitation current Iex that follows are illustrated in FIG. 3.

This FIG. 3 illustrates the change in the output voltage Ubat and in the excitation current Iex following the load dump, the regulation of the current and the functioning of the alternator/starter in degraded mode.

In the range A depicted in FIG. 3, the voltage Ubat is equal to the nominal operating voltage U0, that is to say 42 volts in the example taken, and the excitation current Iex is such that the current generated It is equal to the current consumed Ir. This is nominal mode.

At time $t_0$ a load dump occurs, for example due to the disconnection of the discharged battery 40 or the disconnection of the battery plus another load. The generated current It then becomes greater than the consumed current Ir. At this time the capacitance of the capacitor 15a (as well as the other capacitances on all the other electronic components, including stray capacitances, coupled to the on-board system) charges up with the difference between the generated current It and the consumed current Ir, that is to say It-Ir. Consequently the voltage Ubat increases and then becomes greater than the nominal voltage U0.

A very short time after time $t_0$, at time $t_1$, the excitation current Iex decreases because of the regulation made by the control circuit 13 via the excitation circuit 14, the control circuit 13 having perceived the increase in the voltage Ubat above the nominal voltage U0.

In the example taken, the voltage Ubat nevertheless continues to rise since the excitation current Iex is still too high. The generated current It is still greater than the consumed current Ir.

It should be noted that the slope 201 of the voltage Ubat from time $t_0$ depends on the (positive) difference between the current It generated by the alternator/starter and the current Ir consumed in the on-board system, and the capacitance of the capacitor 15a (as well as the other capacitances on all the other electronic components, including stray capacitances, coupled to the on-board system).

Thus, in the range B depicted, It>Ir, this is still nominal mode and the capacitance of the capacitor 15a charges up.

When, at a time $t_2$, Ubat reaches (through lower values) a first threshold value US1, the control circuit 13 controls the functioning of the power circuit 15 in a degraded mode, ie the performance of the machine is reduced until in a certain case it is cancelled out, as will be seen in detail below.

In this degraded operating mode at least one of the branches Ba, Bb and Bc of the power circuit is locked, being maintained in one of its two conduction states.

The term "maintained" must be assessed with reference to the control frequency Fq2 of the power circuit in nominal mode. In other words, a branch is considered to be locked when it is controlled so as to remain in one of its two conduction states for a length of time corresponding to several control periods in nominal mode.

In other words, the locking frequency Fq1 is lower than the operating frequency Fq2 of the power circuit (or electrical frequency of the machine) in nominal mode, the operating frequency Fq2 being set at a few kHz. In a non-limiting embodiment, the locking frequency Fq2 is situated between 10 Hz and 100 Hz, corresponding to a period of between 10 ms and 100 ms.

The effect obtained is, for a constant current Iex, a reduction in the current It generated by the alternator/starter. Thus the excitation current Iex is reduced not only by the conventional regulation but also by the locking of the branch or branches of the switch bridge.

In a non-limiting embodiment, in order to distribute the losses by heating between the high-side power transistor MHS and the low-side power transistor MLS in the branch, the branch may, during a locking phase, be controlled so as to pass from one conduction state to the other. Thus the high-side transistor MHS is kept conductive and the low-side transistor MLS is kept off for part of the locking time and vice versa (high-side transistor off, low-side transistor conducting) during the other part of the locking time. The times may, for example, be distributed at 50%-50% or at 10%-90%. Naturally any other distribution can be envisaged.

In addition, in a non-limiting embodiment, according to the state of conduction of the branches of the switch bridge before the load dump, it can be chosen to minimize the switchings of switches to be made in degraded mode. For example, if, before the load dump, the two branches Ba and Bb were in the "high" conduction state, and the third branch Bc in the "low" conduction state, in order to pass into degraded mode it suffices to put the third branch in the "high" conduction state and to lock the assembly if it is wished to lock all the branches.

It should be noted that, when several branches of the power circuit 15 are locked, the control circuit 13 maintains the branches in the same locking state, ie in the same conduction state. Thus, for example, all the high-side transistors MHS of the locked branches are conducting and all the low-side transistors MLS of the branches are off.

Thus the reduction in the current It generated by the alternator/starter procured by the locking of one or more branches of the power circuit, in combination with the reduction procured by the regulation (drop in the current Iex controlled by the circuit 13 via the circuit 14), has the effect of making the voltage Ubat drop in the case where the consumption of the current Ir in the electrical equipment that remains connected to the on-board system 50 is higher than the current It generated by the alternator/starter.

Thus, in the case where the current Ir consumed by the on-board system is higher than the current It generated by the alternator/starter, in order to ensure the supply to the electrical equipment connected to the on-board system 50 that must remain in service, it is possible to provide a capacitor in parallel on the on-board system 50. This capacitor fulfils the role of accumulation means, restoring to the consuming components (sized at 42 V, in particular the DC-to-DC converter) of the vehicle during degraded mode, the energy accumulated during the phase of rise in voltage Ubat following on from the load dump. Thus this capacitor is chosen so as to supply the consumers throughout the periods when the machine is in short-circuit. It should be noted that, in the case where this external capacitor is disconnected, the overvoltage detection function still protects the on-board system but also the bridge rectifier.

Here the capacitor 15a of the control and power module 10 can advantageously fulfill this supplementary function, in addition to its function of capacitor for filtering the chopping frequency of the voltage Ubat when the alternator/starter is in nominal mode. There is therefore no need for a supplementary component dedicated to this accumulator function. Thus the consumed current Ir is equal to the generated current It plus the current Ic passing through the capacitor (shown in FIG. 1). By convention, the capacitor 15a will be taken as a generator. When it discharges, the current Ic is positive. When it charges, the current Ic is negative. In FIG. 1, the current Ic is shown positive.

In the contrary case where the current It generated by the alternator/starter is greater than the current Ir consumed by the electrical equipment, the output voltage Ubat continues to increase although the generated current It decreases. At this time it is necessary to lock yet another branch until the voltage Ubat decreases.

Thus, in an advantageous embodiment, if the output voltage Ubat reaches, by lower values, a first threshold value US1 equal to a maximum threshold value Umax, all the branches of the power circuit 15 are locked. 58 volts will for example be taken as the maximum value. In this case, all the phase windings of the armature 21 are short-circuited, so that the total current It generated by the alternator/starter is zero. The decrease in the voltage Ubat on the on-board system 50 is then more rapid, as indicated in FIG. 3, range C between the times $t_2$ and $t_3$.

As will have been understood, in a non-limiting preferential embodiment, the maximum threshold voltage Umax is substantially equal, by lower value, to the maximum voltage acceptable to the electrical equipment connected to the on-board system 50 to which the machine is connected, so that their protection against destruction is effective.

In addition, preferentially, the maximum threshold voltage Umax is also lower than a voltage destroying the electronic components of the bridge rectifier.

In another non-limiting embodiment, the maximum threshold value is not necessarily chosen with consideration for the voltage destroying the electrical equipment connected to the on-board system, taken at 58 V in our example, but it is possible to limit it to a lower value, for example 52V, which would limit the overvoltage in the on-board system to 10 V instead of 16 V with respect to the 42 volts of the nominal voltage. It should be noted that the electrical equipment is in general connected in parallel to the battery 40.

As seen above, there exist several first threshold values US1, according to which one, two or three branches of the switch bridge are locked. Thus, in a non-limiting embodiment, a first threshold value US1 is associated with each specific locking of the switch bridge. For example, the first associated threshold value US1 will be equal to 45 volts for one locked branch, to 55 volts for two locked branches and to 58 volts for three locked branches.

Figure 4A:
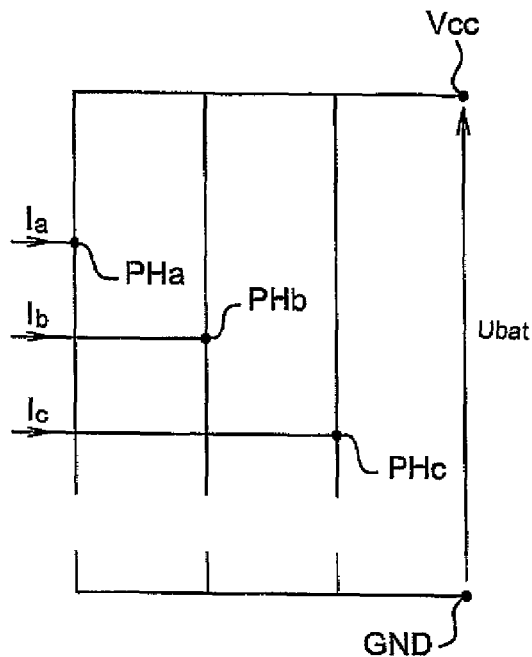
FIG. 4A and FIG. 4B are diagrams illustrating the state of the transistor bridge of FIG. 2 in two configurations of locking of all the branches, according to one embodiment of the present invention.
Figure 4B:
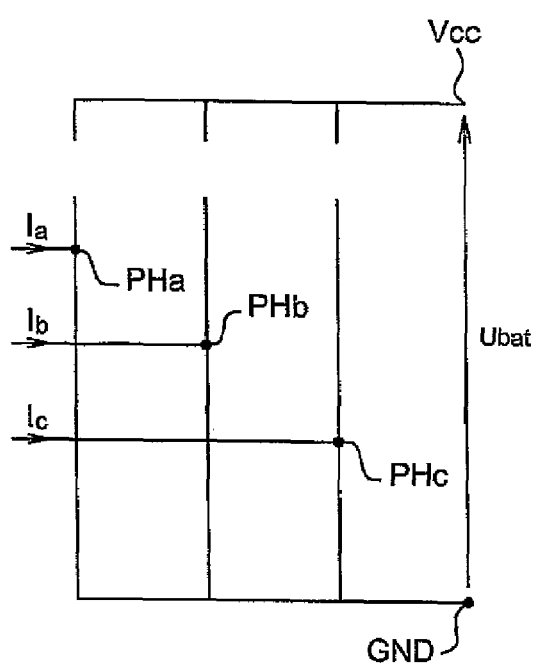

The diagrams in FIG. 4A and FIG. 4B are the equivalent electrical diagrams of the power circuit 15 when all its branches are locked. In the situation in FIG. 4A, all the high-side power transistors are conductive (closed circuit), the low-side power transistors being kept off (open circuit). In the situation in FIG. 4B, conversely, all the low-side power transistors are kept conducting, the high-side power transistors being kept off.

Preferably, as indicated previously, the situations according to FIG. 4A and FIG. 4B are alternated, in order to distribute the losses between the high-side power transistors on the one hand and the low-side power transistors on the other hand. In other words, the power circuit 15 is controlled in degraded operating mode in order to be in the case of FIG. 4A for part of the time, between $t_2$ and $t_3$, of locking the branches (ideally half the time if the transistors are identical, as is usual to have them) and in the case of FIG. 4B the rest of the time.

In summary, in the general case of a single-phase machine (one phase winding, two branches) or polyphase (N phase windings, N branches, N>1), it is thus possible to lock any number N−p of branches, where p is an integer number between 0 and N−1, which affords a reduction in the current It generated by the alternator/starter 30. Thus phase windings will be short-circuited, so that their contribution to the total current It generated by the alternator/starter will be zero. It should be noted that the branch or branches that are not locked are always controlled by the control circuit 13 at the operating frequency Fq2.

Thus, for example, in the case of configuration in a delta, when two branches are locked, one winding is short-circuited for a period of locking time, that is to say 100 ms, and the second and third windings are short-circuited for a shorter period of time of chopping the current, that is to say when the third other branch functioning at the operating frequency Fq2 of a few kHz is in the same conduction state as the two locked branches.

In another example, if only one branch is locked, one winding is short-circuited for a shorter period of time of chopping the current, that is to say when another branch functioning at the operating frequency Fq2 of a few kHz is in the same conduction state as the locked branch.

Returning to FIG. 3, in the example taken, the first threshold value US1 is fixed at 58 volts. Thus, at time $t_2$, the machine 30 is short-circuited by locking all its branches. The total current It generated by the alternator/starter 30 is then zero. Consequently the voltage Ubat decreases, because of the consumption of current by the electrical equipment connected to the on-board system and because the capacitance of the capacitor 15a discharges.

The slope 202 of the voltage Ubat as from time $t_2$ depends on the current Ir consumed in the on-board system, and the capacitance of the capacitor 15a (as well as of the other capacitances, including stray capacitances, coupled to the on-board system).

Thus, in the range C depicted, this is degraded mode, with a zero generated current It, that is to say It<Ir, and the capacitance of the capacitor 15a discharges.

When, at time $t_3$, the voltage Ubat reaches (by higher values) a second threshold value US2, the control circuit 13 re-establishes the functioning of the power circuit 15 in nominal mode. All the locked branches are unlocked. Thus a current It is once again generated.

Naturally the second threshold value US2 is lower than the first threshold value US1. In a non-limiting embodiment, it is equal to the nominal voltage U0 delivered between the supply terminals VCC and GND of the power circuit 15 in nominal mode, that is to say 42 volts here.

However, if the excitation current Iex of the field winding 22, which decreases as from time $t_1$, is still such that the balance between the current It generated by the alternator/starter 30 and the current Ir consumed in the on-board system 50 is still positive (It>Ir), the capacitor 15a charges with the difference in current It−Ir and consequently the voltage Ubat increases again, as can be seen in the example in FIG. 3.

It should be noted that the slope 203 of the voltage Ubat as from time $t_3$ depends on the (positive) difference between the current It generated by the alternator/starter and the current Ir consumed in the on-board system, and the capacitance of the capacitor 15a (as well as other capacitances on all the other electronic components, including stray capacitances, coupled to the on-board system). Thus, in the example illustrated, the voltage Ubat increases again and up to a time $t_4$ without however reaching the maximum threshold voltage Umax. Consequently this is still nominal mode.

Thus, in the range D depicted, this is nominal mode, It>Ir and the capacitor 15a charges.

At time $t_4$, the current Iex has decreased sufficiently so that the current It supplied by the alternator/starter 30 is equal to the current Ir consumed in the on-board system 50. However, the voltage Ubat is still greater than the second threshold value 42 volts. Consequently the control circuit 13 still regulates the excitation current Iex so as to reduce the voltage Ubat.

The voltage Ubat therefore begins to drop again. The current Iex continues to decrease, giving rise to a reduction in the generated current It. The balance between the current It generated by the alternator/starter 30 and the current Ir consumed in the on-board system 50 becomes negative (It<Ir). The capacitance of the capacitor 15a therefore discharges in order to supply the electrical equipment in the on-board system, the generated current It not being sufficiently great to supply all the electrical equipment.

Thus, in the range E depicted, this is nominal mode, Ir>It and the capacitor 15a discharges.

Thus, in the range E depicted, this is nominal mode, Ir>It and the capacitance 15a discharges.

The current Iex decreases until, at time $t_5$, the voltage Ubat reaches, by lower values, the nominal voltage of U0=42 volts.

As from time $t_5$, the current Iex is increased again so as to obtain a voltage Ubat close to 42 volts. At this moment, the generated current It is equal to the consumed current Ir.

As from time $t_8$, the voltage Ubat remains relatively constant and substantially equal to 42 volts. The voltage Ubat and the current Iex are thus stabilized. The regulation of the excitation current Iex is therefore terminated.

Thus, in the range G depicted, this is nominal mode, It=Ir, and the regulation is terminated.

The following table summarizes what was described previously for the example illustrated in FIG. 3.

| Range A | Between t0 and t1 | Nominal mode | It = Ir | |
|---|---|---|---|---|
| Range B | Between t1 and t2 | Nominal mode | It > Ir | Capacitance charges |
| Range C | Between t2 and t3 | Degraded mode | It = 0 | Capacitance discharges |
| Range D | Between t3 and t4 | Nominal mode | It > Ir | Capacitance charges |
| Range E | Between t4 and t5 | Nominal mode | It < Ir | Capacitance discharges |
| Range F | Between t5 and t6 | Nominal mode | It = Ir | |
| Range G | As from t6 | Nominal mode | It = Ir | |

Figure 5:
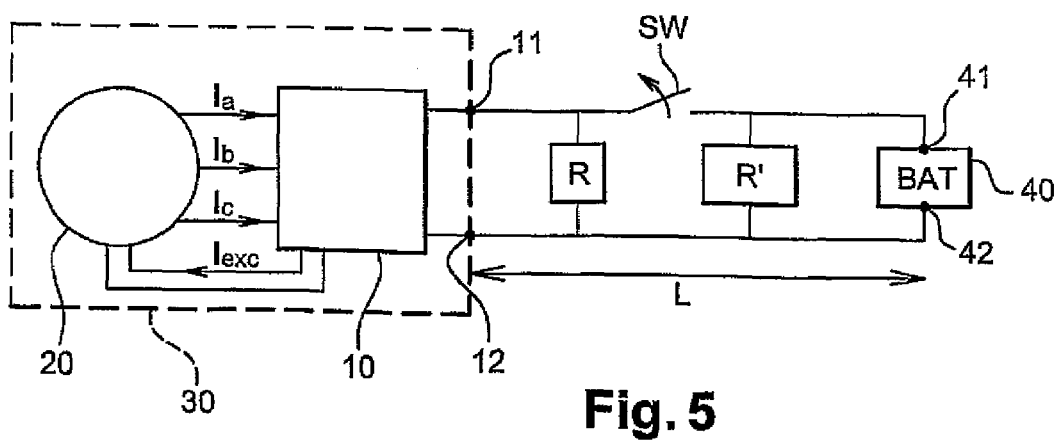
FIG. 5 is a diagram illustrating a circuit produced in practice for testing the functioning of a control and power module of FIG. 1.

FIG. 5 illustrates a circuit produced in practice for testing the functioning of a control and power module 10 according to the present invention.

The tests were carried out with an alternator/starter comprising a standard electromechanical part and a control and power circuit according to the present invention. The battery has been replaced by a capacitor ("Supercap") of 150 F. The on-board system comprises a resistive load R corresponding to a 40 A consumer at the output from the alternator/starter, followed by an electronic load R' corresponding to an 80 A consumer. A switch SW is placed between the loads R and R' in order to simulate disconnection of a battery plus a consumer or a battery alone discharged. The first threshold value US1 is fixed at 52 V. The second threshold value US2 is fixed at 40 V. The total length L of the corresponding connections to the on-board system is approximately 4 m. The load dump is created by the opening of the switch SW.

Figure 6:
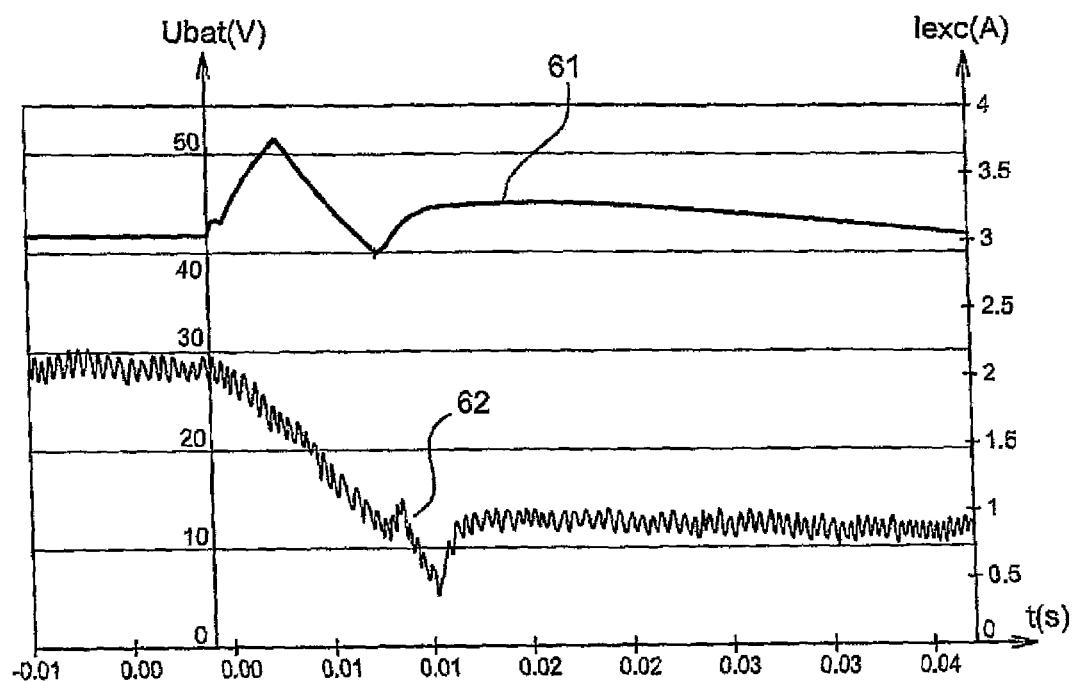
FIG. 6 and FIG. 7 are graphs of the voltage on the on-board system and of the excitation current of the electrical machine, for respective test conditions of the circuit in FIG. 5.

The first test (FIG. 6) was carried out with a current in the electronic load R' equal to approximately 80 A. The curve 61 and the curve 62 give respectively the voltage Ubat and the current Iex as a function of time. Here the voltage Umax is reached once. The power circuit 15 is therefore controlled in degraded mode once, approximately between t=5 ms and t=15 ms, with all its branches locked.

Figure 7:
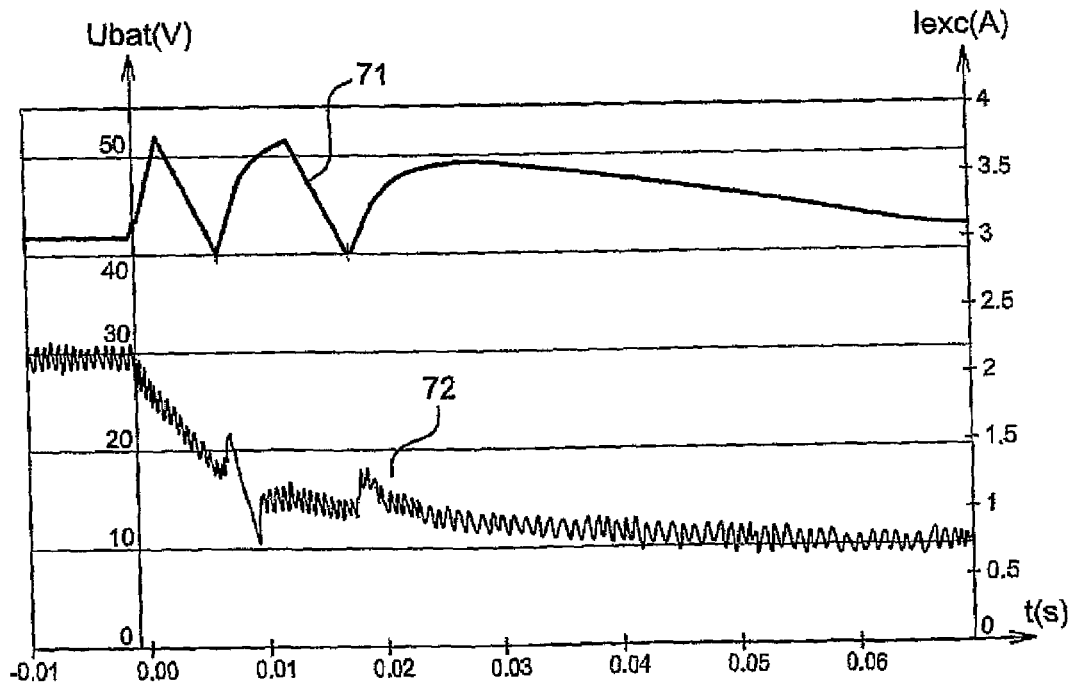

The second test (FIG. 7) was carried out with a current in the electronic load R' equal to approximately 120 A. The curve 71 and the curve 72 give respectively the voltage Ubat and the current Iex as a function of time. Here the voltage Umax is reached twice. The power circuit 15 is controlled in degraded mode a first time, approximately between t=1 ms and t=6 ms, then a second time, approximately between t=12 ms and t=17 ms, with all its branches locked.

Thus, the control and power module according to the invention has many advantages, which include the following:

Firstly, it is no longer necessary, as in the prior art, to use a large number of MOSFETs in parallel in order to maintain clipping for the de-excitation time for the excitation current Iex. In addition, it is no longer necessary to use specific MOSFETs that clip for a given time corresponding to the de-excitation time for the excitation current Iex.

Secondly, it is no longer necessary to be limited to MOSFETs having a precise clipping value. Because of this, the difficulty of obtaining a very precise clipping value is avoided, the value being a function of variable parameters such as temperature.

Thirdly, additional components are not used.

Fourthly, the electronics of the power circuit are protected against load dumps so that the power transistors cannot blow. They are less stressed since, in the context of the invention, the voltage clipping function is no longer performed by the transistors.

While the process and product herein described constitute preferred embodiments of this invention, it is to be understood that the invention is not limited to this precise process and product, and that changes may be made therein without departing from the scope of the invention which is defined in the appended claims.

What is claimed is:

1. A control and power module for a rotary electrical machine comprising a plurality of phase windings, said control and power module comprising:
    a power circuit comprising a plurality of branches intended to be associated with said plurality of phase windings, and
    a control circuit constructed to control said power circuit when the machine is functioning in a nominal mode;
    wherein said control circuit
    monitors an output voltage (Ubat) of said power circuit; and
    locks at least one branch of said power circuit in a conduction state when said output voltage (Ubat) reaches at least a first threshold value (US1).

2. The control and power module according to claim 1, in which said control circuit re-establishes the functioning of said rotary electrical machine in nominal mode, when said output voltage (Ubat) reaches a second threshold value (US2).

3. The control and power module according to claim 1, wherein said control circuit locks all branches of said power circuit when said output voltage (Ubat) reaches a first threshold value (US1).

4. The control and power module according to claim 1, wherein said power circuit also comprises energy accumulation means.

5. The control and power module according to claim 2, wherein said at least first threshold value (US1) is higher than the second threshold value (US2).

6. The control and power module according to claim 2, wherein said second threshold value (US2) is substantially equal to a nominal value (U0) of a voltage that is delivered by said power circuit in nominal mode.

7. The control and power module according to claim 1, wherein said at least first threshold value (US1) is lower than a voltage destroying electrical equipment intended to be supplied by the output voltage (Ubat) of said power circuit.

8. The control and power module according to claim 1, wherein said control circuit is adapted so as, when a branch is locked, to maintain said branch in a first conduction state for part of the locking time and to maintain said branch in a second conduction state during the rest of the locking time.

9. The control and power module according to claim 1, wherein said at least one branch of the power circuit comprises two switches (MHS, MLS), and in which, in a conduction state of said branch, one of the switches (MHS) is conducting and the other switch (MLS) is off.

10. The control and power module according to claim 1, wherein said control circuit is adapted to maintain all the branches of said power circuit that are locked in the same conduction state.

11. The control and power module according to claim 1, wherein said switch comprises at least one power transistor (MOS).

12. The control and power module according to claim 1, wherein said at least one branch takes place at a locking frequency (Fq1) less than an operating frequency (Fq2) of said power circuit in nominal mode.

13. A polyphase reversible rotary electrical machine comprising a control and power module according to claim 1.

14. A method of controlling a rotary electrical machine adapted to function in nal mode, said rotary electrical machine comprising a plurality of phase windings and a power circuit comprising a plurality of branches intended to be associated with said plurality of phase windings; wherein said method further comprises the steps of:

monitoring an output voltage (Ubat) of said power circuit;
locking at least one branch of said power circuit in a conduction state when said output voltage (Ubat) reaches an at least first threshold value (US1).

15. The control method according to claim 14, wherein said method further comprises the step of re-establishing the functioning of said rotary electrical machine in nominal mode when said output voltage (Ubat) reaches a second threshold value (US2).

16. The control method according to claim 14, wherein said locking step, all of said plurality of branches of said power circuit are locked when said output voltage (Ubat) reaches a first threshold value (US1).

17. The control method according to claim 14, wherein said power circuit also comprises energy accumulation means.

18. The control method according to claim 15, in which the second threshold value (US2) is substantially equal to a nominal value (U0) of a voltage that is delivered by said power circuit in nominal mode.

19. The control method according to claim 14, wherein said at least first threshold value (US1) is less than a voltage destroying electrical equipment intended to be supplied by the output voltage (Ubat) of said power circuit.

20. The control method according to claim 14, wherein during the step of locking a branch, said branch is maintained in a first conduction state for part of the locking time and is maintained in a second conduction state for the rest of said locking time.

21. The control method according to claim 14, wherein a branch of said power circuit comprises two switches (MHS, MLS) and in which, in a given state of conduction of said branch, one switch (MHS) on said branch is conducting and the other switch (MLS) is off.

22. The control method according to claim 14, wherein said locked branches of said power circuit are all maintained in the same conduction state.

23. The control method according to claim 14, wherein said step of locking said at least one branch is performed at a locking frequency (Fq1) lower than an operating frequency (Fq2) of said power circuit in nominal mode.

* * * * *